(12) United States Patent
Fuller et al.

(10) Patent No.: US 6,767,204 B2
(45) Date of Patent: Jul. 27, 2004

(54) INTERLOCK FOR A COLUMN IN AN INJECTION MOLDING MACHINE

(75) Inventors: Klaus Fuller, Schwerin (DE); Lothar Elsner, Pampow (DE)

(73) Assignee: Battenfeld GmbH, Meinerzhagen (DE)

( * ) Notice: Subject to any disclaimer, the term of this patent is extended or adjusted under 35 U.S.C. 154(b) by 207 days.

(21) Appl. No.: 10/044,292

(22) Filed: Jan. 11, 2002

(65) Prior Publication Data

US 2002/0102325 A1 Aug. 1, 2002

(30) Foreign Application Priority Data

Jan. 12, 2001 (DE) .......................................... 101 01 138

(51) Int. Cl.[7] .............................................. B29C 45/64
(52) U.S. Cl. .................. 425/595; 264/328.1; 425/451.9
(58) Field of Search .............................. 425/595, 451.9; 264/328.1

(56) References Cited

U.S. PATENT DOCUMENTS

| | | | |
|---|---|---|---|
| 3,449,795 A | * 6/1969 | Fishbach | ............ 425/DIG. 221 |
| 3,465,387 A | 9/1969 | Allard, et al. | |
| 4,105,390 A | 8/1978 | Hehl | |
| 4,281,977 A | 8/1981 | Farrell | |
| 4,645,443 A | 2/1987 | Aoki | |
| 5,018,961 A | 5/1991 | Miese et al. | .............. 425/450.1 |
| 5,238,394 A | * 8/1993 | Hirata | .......................... 425/595 |
| 5,580,584 A | 12/1996 | Mussler et al. | .............. 425/143 |
| 5,750,155 A | 5/1998 | Eckardt et al. | .............. 425/130 |

FOREIGN PATENT DOCUMENTS

| | | |
|---|---|---|
| DE | 20 65 899 A1 | 10/1976 |
| DE | 28 12 301 A1 | 11/1978 |
| DE | 274 590 B3 | 1/1993 |
| EP | 0 188 000 A2 | 7/1986 |
| EP | 0 841 143 A2 | 5/1998 |
| JP | 01263007 | 10/1989 |
| JP | 11033796 | 2/1999 |

* cited by examiner

Primary Examiner—James P. Mackey
(74) Attorney, Agent, or Firm—Hamilton, Brook, Smith & Reynolds, P.C.

(57) ABSTRACT

The invention relates to an interlock for a column, comprising a piston with a piston rod, such that the piston rod is disposed in a claw bush, the claw bush being disposed in a single- or multi-part plate, such that the piston and the claw bush can move in the single- or multi-part plate. In one embodiment, the claw bush has at least two stages, to apply the force in a distributed manner, the contour of the stages corresponding to the end of the piston rod and/or to the end of the column, the average radius of the first stage differing from the average radius of the second stage.

9 Claims, 5 Drawing Sheets

INTERLOCK FOR A COLUMN IN AN INJECTION MOLDING MACHINE

RELATED APPLICATION

This application claims priority to German patent application DE 101 01 138.5-16, filed on Jan. 12, 2001, the entire contents of which are incorporated herein by reference.

BACKGROUND OF THE INVENTION

Interlocks for use in injection molding machines are known and are used especially in two-plate injection molding machines. Thus, DD 274 590, for example, describes an interlock which is directed toward a common intersection of the mid-perpendiculars of each of the respective contact surfaces of the claw bush and the piston and the rod point. The entire teachings of DD 274 590 are incorporated herein by reference.

U.S. Pat. No. 3,465,387 also discusses the problem of joining a rod or column of a two-plate injection molding machine to a second plate flexibly, but permanently. The overhung columns are guided in a fixed bearing and also in a second bearing disposed in a bush. This second bearing has limited flexibility due to the geometric shape of the bush. This flexible bearing and the masses of the overhung ends of the column cause the position of the column ends to deviate from their longitudinal axes when dipping into the high-pressure clamping cylinders. To compensate this, the clamping cylinders have a very complex structure. The interlock jaws are mounted movably in the hydraulic fluid inside the hydraulic fluid cell so that considerable deviations of the columns from their longitudinal axes can be compensated and so as also to assure that the interlock jaws will have the freedom of motion required by the bending of the plates during the build-up of the closure force. However, this multi-component structure of the cylinder is very expensive to produce. It is a complicated mechanism consisting of many individual parts, and thus prone to trouble. The entire teachings of U.S. Pat. No. 3,465,387 are incorporated herein by reference.

SUMMARY OF THE INVENTION

The proposed solutions have the disadvantage that the rod is supported in an expensive bearing and that the forces are transmitted to the rod at one point.

It is one aspect of the invention to offer a solution by which the forces are applied in a distributed manner, without significantly interfering with flexibility in the bearing.

In one embodiment, a claw bush has at least two stages, to apply the force in a distributed manner, the contour of the stages corresponding to the end of the piston rod and/or to the end of the column, the average radius of the first stage differing from the average radius of the second stage. This design achieves the result that the actual forces are transmitted on different levels. This holds both for their transmission to the column and also for the piston, but also for application of the force to the claw bush.

The two different stages can be doubled, that is, on the one hand, two stages which correspond to the column and whose two corresponding contours have different average radii and, on the other hand, two stages which correspond to the piston end and whose two corresponding contours have different average radii. The different average radii assure that the force flux acting on the first stage is applied to the column and to the piston respectively along another circumferential line than the force flux acting on the second stage. The two duplicate structures can be designed symmetrical.

It can be advantageous for the corresponding surfaces to make an angle with the center axis of the column. In some applications, the best force flux is achieved if the angle α is between 30° and 60°, and in one embodiment, about 45°.

The cross-sectional form of the column and of the piston end can be any sensible and economically produced cross-section. A round cross section can be used, but a rectangular, octagonal, or, for example polygonal one can also be used.

The proposed solution can be suited for locking a closure unit of a two-plate injection molding machine for processing plasticized material.

BRIEF DESCRIPTION OF THE DRAWINGS

The foregoing and other objects, features and advantages of the invention will be apparent from the following more particular description of various embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of various embodiments of the invention follows.

Figure 1:
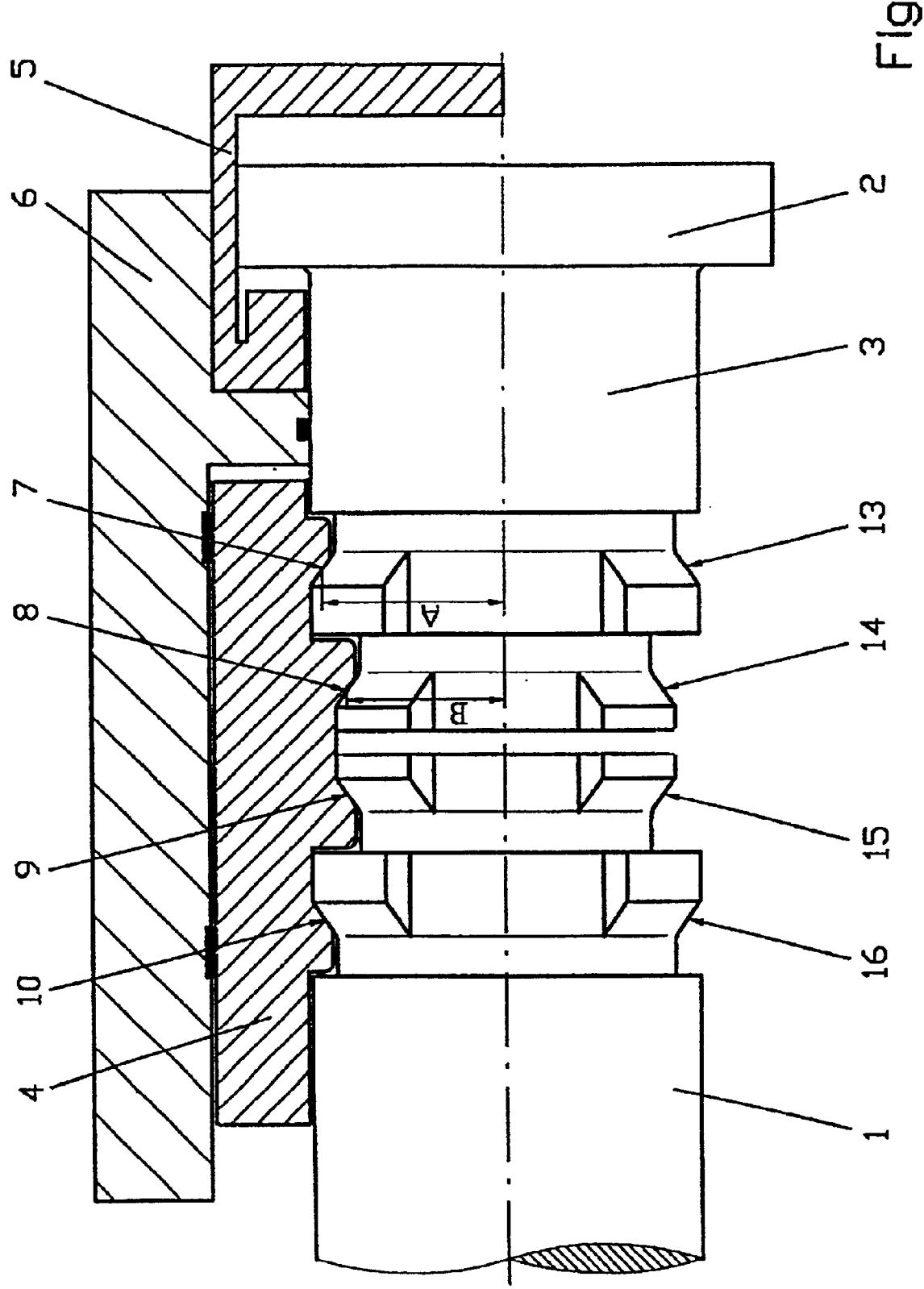
FIG. 1 shows a half-sectional view through the interlock.

FIG. 1 shows a half-sectional view through the interlock. Only the upper half of the claw bush 4 and of the multi-component plate 5, 6 is shown. The interlock is shown for a column 1 with a piston 2 having a piston rod 3, deployed in a two-part plate 5, 6. The piston rod 3 interacts with the claw bush 4. The claw bush 4 and the piston 2, 3 are movably mounted in the plate 5, 6. The claw bush 4 has several stages. Two stages 7, 8 correspond to the piston rod 3; two stages 9, 10 correspond to the column 1. The first stage 7 for the piston is symmetric to the first stage 10 for the column, and the second stage 8 for the piston is likewise symmetric to the second stage 9 for the column. The surfaces 13, 14, 15, 16 corresponding to the stages 7, 8, 9, 10 respectively, are also shown.

Figure 2A:
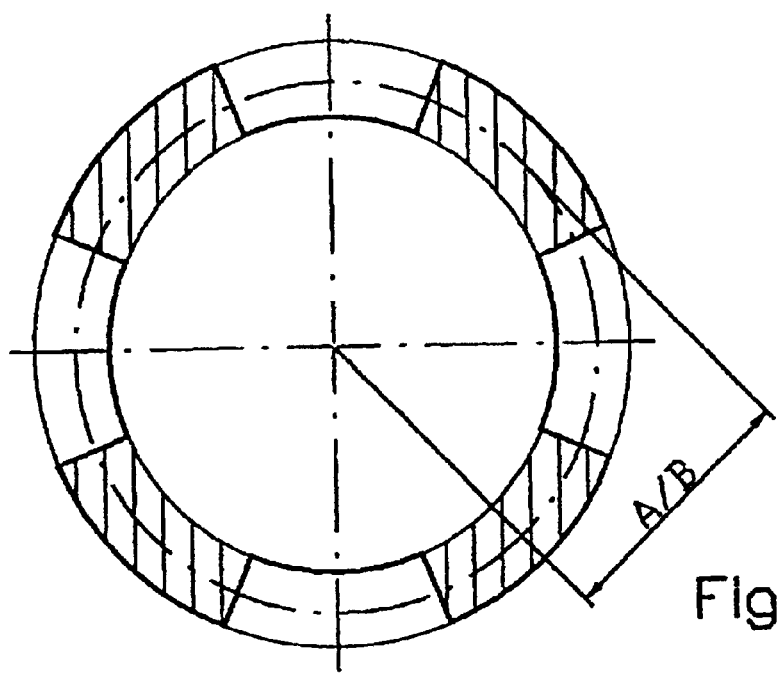
FIG. 2A shows the average diameters A and B.
Figure 2B:
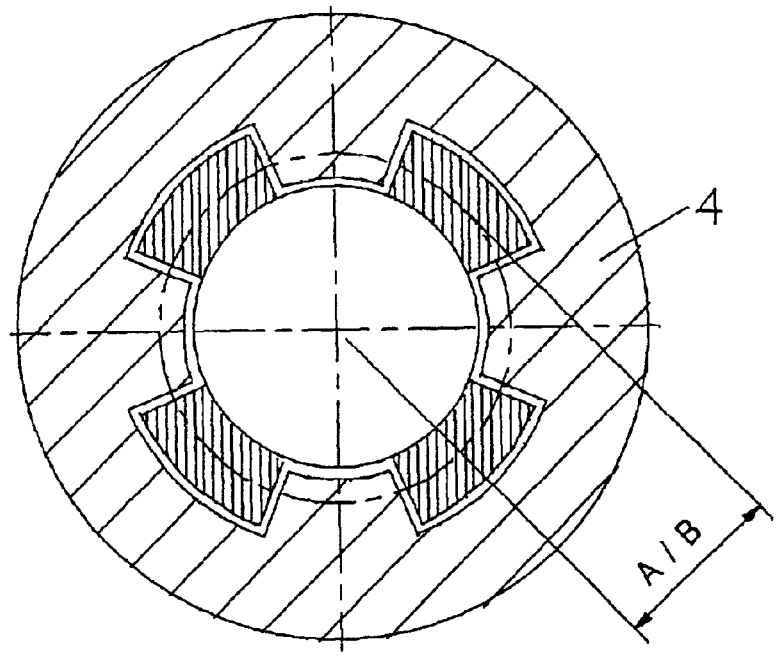
FIG. 2B shows the claw bush prior to locking onto the column.
Figure 2C:
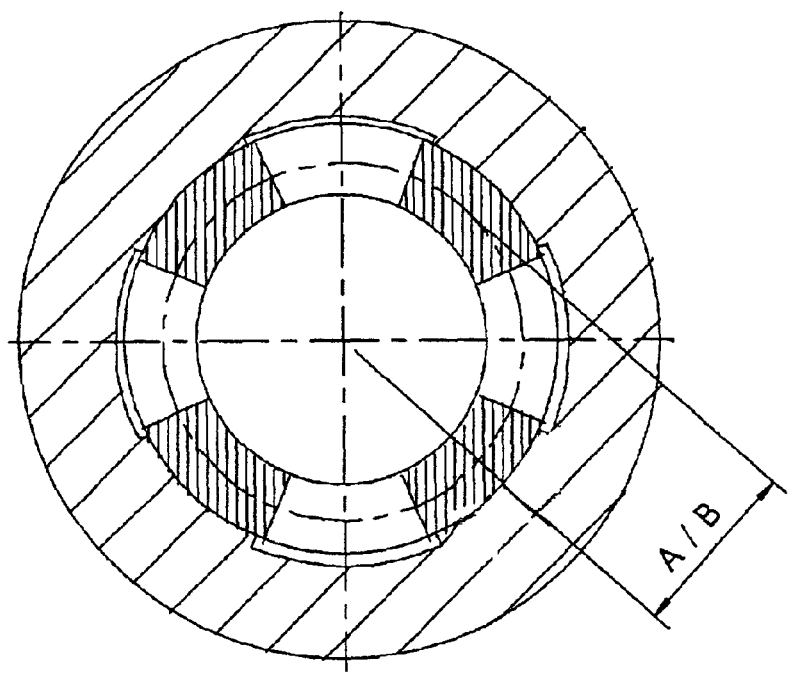
FIG. 2C shows the claw bush locked onto the column.
Figure 3:
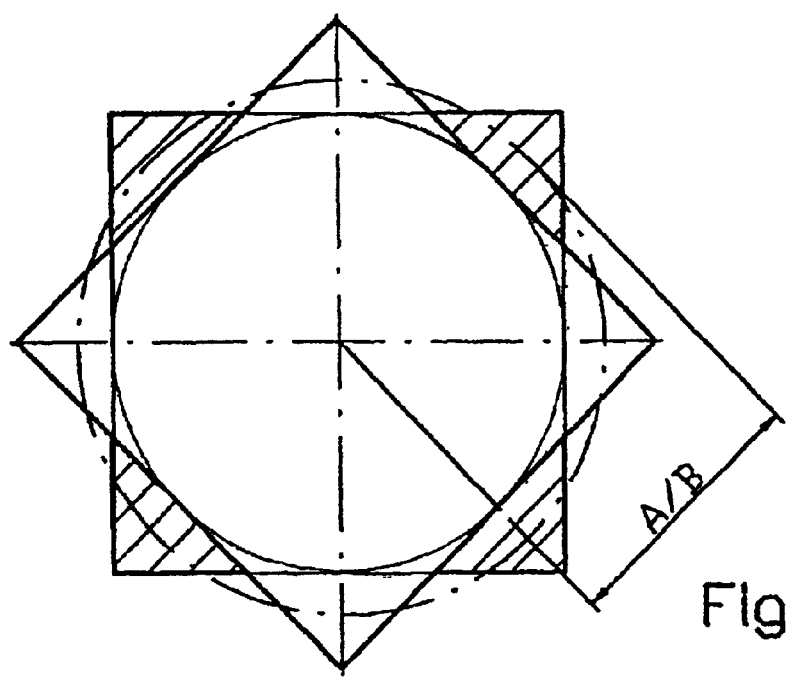
FIG. 3 shows various alternatives of the projected surfaces.

A projected surface of the first stage 13 or 16 has the average radius A, and a projected surface of the second stage 14 or 15 has the average radius B (FIG. 2A). FIG. 2B shows the claw bush 4 before locking onto the end of column 1. The teeth of the column 1 and claw bush 4 are circumferentially displaced to allow for relative axial movement into locking position. FIG. 2C shows the claw bush 4 locked onto the end of column 1 by rotation of the column 1. FIG. 3 shows an alternative cross section.

Figure 4:
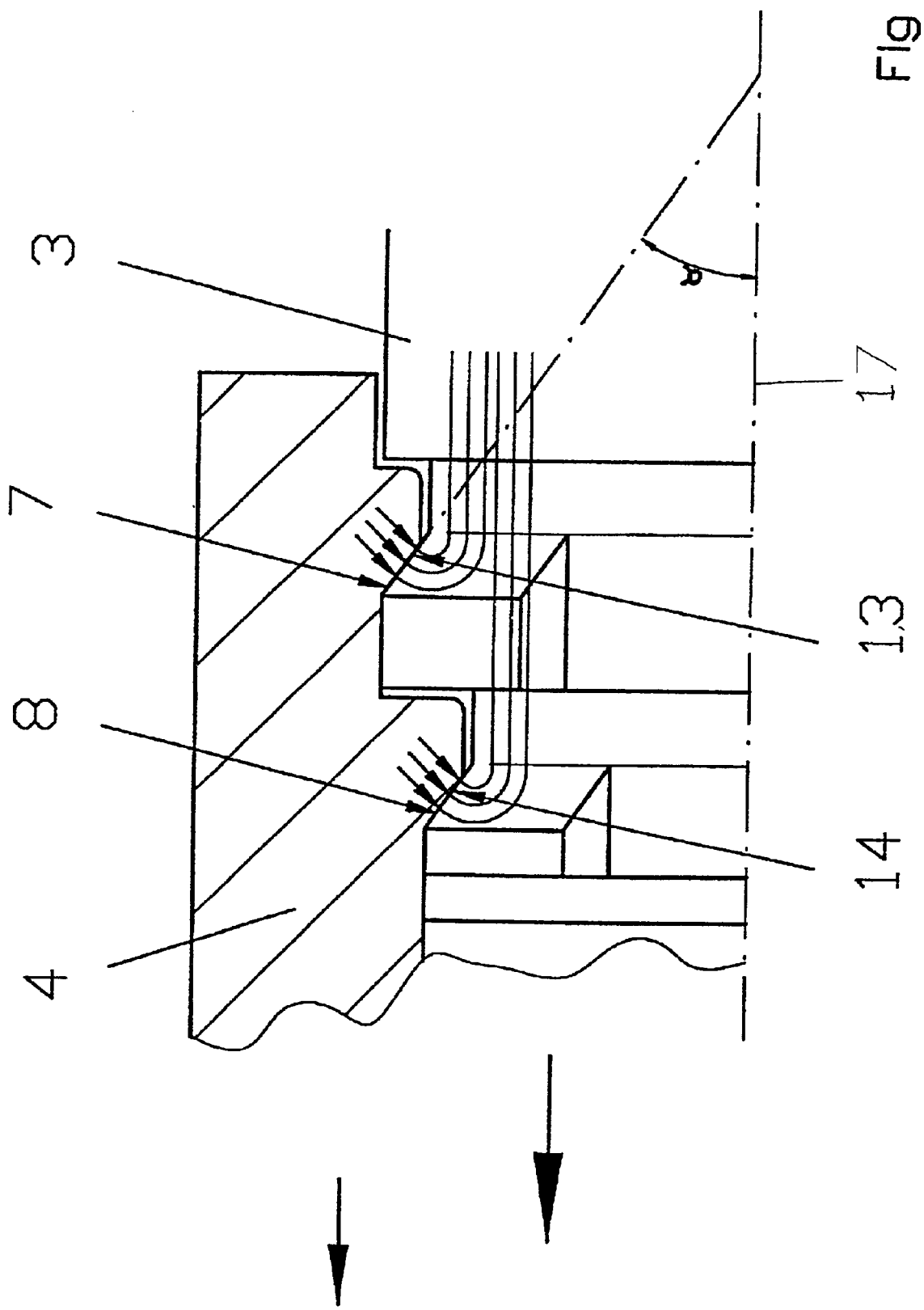
FIG. 4 shows the angular relationships and the force flux.

FIG. 4 shows the angle of the surfaces relative to the center axis 17 of the column and of the piston rod. The force flux and thus the force distribution on the cross section of column 1 and of the piston rod 3 are also shown in FIG. 4. The tensile forces in the claw bush 4 are transmitted through the stages to the corresponding surfaces. As an example, the first stage 7 and the second stage 8 with the corresponding surfaces 13 and 14 are considered here. The tensile forces in the claw bush 4 are thus transmitted as compressive forces to the surfaces 13 and 14. Due to the different diameters of the projected surfaces 13 and 14, the force is transmitted to different levels in the core cross section of the piston rod 3 and column 1. The force which is applied through the surface 13 acts on the exterior region of the cross section, and the force which is applied through the surface 14 acts more on the interior region. The drawn-in lines are supposed to clarify this force flux.

Figure 5:
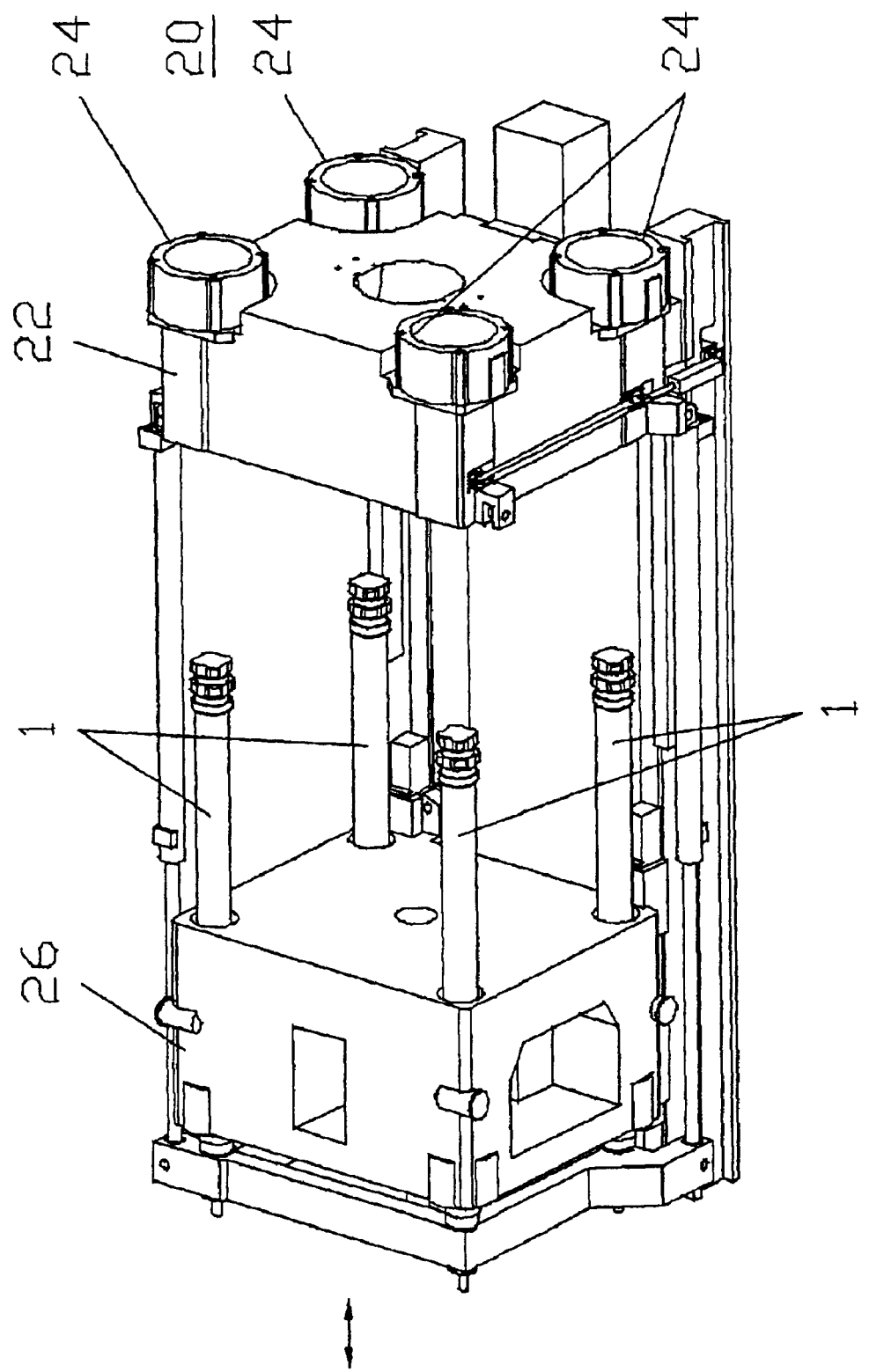
FIG. 5 shows a perspective view of the interlock embodied in an injection molding machine.

FIG. 5 illustrates one embodiment of an injection molding machine 20 in which the interlock can be implemented. A stationary platen 22 supports the claw bushes 4 in support members 24. Platen 26 is movable with respect to platen 22. A mold (not shown), in which the injection molding part is formed, is disposed between platens 22 and 26. Platen 26 is moved toward platen 22 such that the ends of the columns 1 are positioned in the claw bushes 4 as shown in FIG. 2B. The columns 1 are rotated about their longitudinal axes such that they lock onto the claw bushes 4 as shown in FIGS. 1 and 2C. The piston 2 is then used to apply the clamping pressure to the mold.

While this invention has been particularly shown and described with references to various embodiments thereof, it will be understood by those skilled in the art that various changes in form and details may be made therein without departing from the scope of the invention encompassed by the appended claims.

What is claimed is:

1. An interlock for a column, comprising a piston with a piston rod, such that the piston rod is disposed in a claw bush, the column also being disposed in the claw bush adjacent the piston rod, the claw bush and the piston being disposed in a single- or multi-part plate, such that the piston and the claw bush can move in the single- or multi-part plate, the claw bush having at least two stages to apply force in a distributed manner, contour of the stages corresponding to an end of the piston rod and/or to an end of the column, an average radius of the first stage differing from an average radius of the second stage.

2. The interlock of claim 1, wherein the claw bush has four stages, two different stages corresponding to the column and two different stages corresponding to the piston rod.

3. The interlock of claim 2, wherein the stages corresponding to the column are designed symmetric to the stages corresponding to the piston.

4. The interlock of claim 1, wherein an angle α of surfaces of at least one of the contours to a center axis of the column is between about 30° and 60°.

5. The interlock of claim 4, wherein the angle α is about 45°.

6. A two-plate injection molding machine to process plasticized material, wherein the closure unit of the machine is designed with an interlock comprising a piston with a piston rod, such that the piston rod is disposed in a claw bush, the column also being disposed in the claw bush adjacent the piston rod, the claw bush and the piston being disposed in a single- or multi-part plate, such that the piston and the claw bush can move in the single- or multi-part plate, the claw bush having at least two stages, to apply force in a distributed manner, contour of the stages corresponding to an end of the piston rod and/or to an end of the column, an average radius of the first stage differing from an average radius of the second stage.

7. An interlock for use in an injection molding machine comprising a piston connected to a piston rod, the piston rod being disposed in a claw bush, the interlock also including a column being disposed in the claw bush adjacent the piston rod, the claw bush and the piston being disposed in, and movable relative to at least one plate, the claw bush including at least two stages, each stage having a contour for applying force in a distributed manner, the contour of the stages corresponding to an end of the piston rod and/or to an end of the column, an average radius of the first stage differing from an average radius of the second stage.

8. A method for interlocking a column within a claw bush comprising providing a piston rod connected to a piston, the piston rod being disposed in a claw bush, the column also being disposed in the claw bush adjacent the piston rod, the claw bush and the piston being disposed in, and movable relative to at least one plate, the claw bush including at least two stages, each stage having a contour for applying force in a distributed manner, the contour of the stages corresponding to an end of the piston rod and/or to an end of the column, an average radius of the first stage differing from an average radius of the second stage.

9. The method of claim 8, wherein the column is rotated about its longitudinal axis to lock within the claw bush.

* * * * *